(12) United States Patent
Horiuchi et al.

(10) Patent No.: US 6,998,745 B2
(45) Date of Patent: Feb. 14, 2006

(54) DYNAMO-ELECTRIC MACHINE HAVING A ROTOR WITH FIRST AND SECOND AXIALLY OR ROTATIONALLY DISPLACABLE FIELD MAGNETS

(75) Inventors: Toshimitsu Horiuchi, Miyota-Machi (JP); Andreas Kull, Miyota-Machi (JP)

(73) Assignee: Minebea Co., Ltd., Nagano-Ken (JP)

( * ) Notice: Subject to any disclaimer, the term of this patent is extended or adjusted under 35 U.S.C. 154(b) by 102 days.

(21) Appl. No.: 10/385,266

(22) Filed: Mar. 10, 2003

(65) Prior Publication Data
US 2003/0184175 A1 Oct. 2, 2003

Related U.S. Application Data

(60) Provisional application No. 60/363,937, filed on Mar. 12, 2002.

(30) Foreign Application Priority Data
Apr. 2, 2002 (JP) ............................. 2002-099629

(51) Int. Cl.
*H02K 7/08* (2006.01)

(52) U.S. Cl. ...................................................... 310/90
(58) Field of Classification Search ............ 310/67 R, 310/90–91, 42, 261, 89; 360/99.7–99.8, 360/98.07, 99.04; 384/10, 107, 120, 131, 384/132
See application file for complete search history.

(56) References Cited

U.S. PATENT DOCUMENTS

| | | | | |
|---|---|---|---|---|
| 4,892,418 A | * | 1/1990 | Asada et al. .................. 384/124 |
| 5,142,173 A | * | 8/1992 | Konno et al. ................ 310/67 R |
| 5,427,456 A | * | 6/1995 | Hensel ......................... 384/112 |
| 5,487,608 A | * | 1/1996 | Leuthold et al. .............. 384/113 |
| 5,516,212 A | * | 5/1996 | Titcomb ...................... 384/107 |
| 5,659,445 A | * | 8/1997 | Yoshida et al. ............ 360/98.07 |
| 5,770,906 A | * | 6/1998 | Hazelton et al. ............... 310/90 |
| 6,040,648 A | * | 3/2000 | Kawawada et al. ............. 310/90 |
| 6,183,135 B1 | * | 2/2001 | Kloeppel et al. ............. 384/112 |
| 6,246,139 B1 | * | 6/2001 | Iwaki et al. .................... 310/90 |
| 6,292,328 B1 | * | 9/2001 | Rahman et al. ............ 360/99.08 |
| 6,307,293 B1 | * | 10/2001 | Ichiyama ..................... 310/90.5 |
| 6,339,270 B1 | * | 1/2002 | Ichiyama ................... 310/67 R |
| 6,375,357 B1 | * | 4/2002 | Miura et al. ................. 384/100 |
| 6,502,990 B1 | * | 1/2003 | Narita ......................... 384/100 |
| 6,552,456 B1 | * | 4/2003 | Goto et al. ..................... 310/90 |
| 6,657,340 B1 | * | 12/2003 | Obara ........................... 310/90 |
| 6,815,854 B1 | * | 11/2004 | Kull .............................. 310/90 |
| 6,822,358 B1 | * | 11/2004 | Nozaki et al. ................. 310/90 |

* cited by examiner

*Primary Examiner*—Burton S. Mullins
*Assistant Examiner*—Heba Elkassabgi
(74) *Attorney, Agent, or Firm*—John J. Skinner, Jr.; Joel E. Lutzker; Schulte Roth & Zabel

(57) ABSTRACT

An apparatus for and a method of construction of a spindle motor having a bearing unit, a rotary shaft, a rotary hub member and an electro-magnetic motor is presented. The rotary shaft has a flange attached at a mid-section in an axial direction, between large and small diameter sections of the rotary shaft. Grooves between the bearing unit, rotary shaft and flange create radial dynamic pressure generating areas, each with as long as possible a span, and thrust dynamic pressure generating areas to both sides of the flange.

17 Claims, 7 Drawing Sheets

DYNAMO-ELECTRIC MACHINE HAVING A ROTOR WITH FIRST AND SECOND AXIALLY OR ROTATIONALLY DISPLACABLE FIELD MAGNETS

BACKGROUND OF THE INVENTION

1. Field of the Invention

The present invention relates to an apparatus for and a method of construction of a spindle motor which provides for an accurate and precise rotation, and more particularly, to an apparatus for and a method of construction of a motor for a hard disk drive (HDD) of a magnetic disk device or for other information storage devices. The present invention also relates to an information storage device incorporating a novel spindle motor.

2. Description of the Related Art

FIG. 1 shows the construction according to the related art of a spindle motor having a hub, rotated by an electromagnetic motor, supported in a freely rotatable manner on a bearing through a rotary shaft. With this spindle motor, a rotary shaft 92 is supported in a freely rotatable manner on a bearing unit 91 which is fixed to a base 90. A hub 93 is fixed onto the upper-end protruding section of the rotary shaft 92, and the hub 93 is allowed to rotate with the rotary shaft 92 as a center by means of a motor comprising a stator unit 94 fixed to the base 90 and a magnet 95 fixed to the hub 93. A magnetic disk (not shown) is mounted on the hub 93 and which therefore rotates together with the hub 93.

The bearing unit 91 is constructed with a sleeve 91A which is subjected to the radial load of the rotary shaft 92, and with a counter plate 91B which is subjected to the thrust load of the rotary shaft 92. The counter plate 91B is fixed to the lower-end face of the sleeve 91A and closes the lower-end opening of a shaft hole 91a of the sleeve 91A, but the upper side of the shaft hole 91a is left open. On the other hand, the rotary shaft 92 has a flange 92A at the lower-end section thereof. A lubricant is supplied between the bearing unit 91 and the rotary shaft 92, and there is provided a dynamic pressure generating section between them by which to generate a dynamic pressure to the lubricant.

The dynamic pressure generating section can be divided into a radial dynamic pressure generating section, which is subjected to the radial load of the rotary shaft 92, and a thrust dynamic pressure generating section, which is subjected to the thrust load of the rotary shaft 92. The radial dynamic pressure generating section has a plurality of grooves formed in the peripheral direction along the inner peripheral face of the sleeve 91A. Whereas, the thrust dynamic pressure generating section has a plurality of grooves formed in the peripheral direction respectively on the upper face of the counter plate 91B facing the flange 92A and on the step section 91b of the sleeve 91A facing the flange 92A. Dynamic pressure is generated when the lubricant supplied to the grooves is pressurized due to the rotation of the rotary shaft 92. It then becomes possible to maintain the rotary shaft 92 in a non-contact state and to support it highly accurately during rotation at a low torque by the generation of the dynamic pressure. As such grooves V-shaped herring bone grooves, which converge in the direction of rotation of the rotary shaft 92, are generally used.

If two rows of the radial dynamic pressure generating section were installed in the axial direction of the rotary shaft 92, the rigidity of the bearing increases and the oscillating characteristics of the rotary shaft improve. Furthermore, the longer the span between the two rows, the more effective such effects are. However, because the rotary shaft 92 of the spindle motor shown in FIG. 1 has a flange 92A at the lower-end section thereof, the length of the shaft section of the lower side from the flange 92A becomes very short (even to the point of being non-existent). Accordingly, it has been difficult to install two rows of radial dynamic pressure generating sections. One may think of making the shaft section longer in order to install two rows of radial dynamic pressure generating sections, but such a measure cannot accommodate the recently required trend of making a spindle motor thinner. That is to say, with a conventional spindle motor, it is difficult to allow two rows of radial dynamic pressure generating sections to be installed to satisfy the requirement of making the motor thin, and because of this, the improvement in oscillating characteristics of the motor has been impeded.

SUMMARY OF THE INVENTION

Accordingly, the present invention is directed to a spindle motor which allows two rows of radial dynamic pressure generating sections to be installed, with as long as possible a span between the two, thereby greatly improving the oscillating characteristics of a rotary shaft while still allowing for the thickness of the spindle motor to be sufficiently thin.

As such, in one embodiment, the spindle motor of the present invention is constructed having a rotary shaft with a flange at the mid-section in an axial direction, a bearing unit which supports the rotary shaft in a freely rotatable manner, a rotary hub member which is fixed to the rotary shaft, and a motor by which to allow the rotary hub member to rotate by an electromagnetic action. The hub may be configured to mount a magnetic disk or other information storage medium. A fluid is supplied between the rotary shaft and the bearing unit.

The spindle motor is also characterized in that there are provided radial dynamic pressure generating sections between the bearing unit and outer peripheral surfaces on the rotary shaft to either side of the flange, and in that there is provided a thrust dynamic pressure generating section between the bearing unit and an end-face of the flange. As such, two rows of radial dynamic pressure generating sections can be installed in correspondence to both ends of the rotary shaft and with as long as possible a span between the two. Because of this, it is possible to achieve a great improvement in the oscillating characteristics of the rotary shaft with the present invention. In addition, since it is possible to install two rows of the radial dynamic pressure generating sections with as long as possible a span without lengthening the rotary shaft, the design and construction can sufficiently cope with a reduction in thickness of the spindle motor.

The spindle motor is further characterized in that a bearing sleeve of the bearing unit into which the rotary shaft is inserted is such that one end thereof is open and the other end thereof is closed by a counter plate. The rotary shaft is formed such that, with the flange as a boundary, the section of the shaft adjacent the open-end side of the bearing unit has a larger diameter and the section adjacent the closed-end side, i.e., towards the counter plate, has a smaller diameter. Furthermore, a step section, by which to receive the end face of the flange, is formed on the bearing unit. This allows for, in a case in which an impact is applied to the rotary shaft in the axial direction towards the counter plate side, the force of the impact to be transmitted to and sustained by the step section of the bearing unit from the end face of the counter plate side of the flange. Because of this, no stress is applied to the junction section between the flange and the rotary shaft, and thus formation of a defect in the junction section may be prevented or the flange may be prevented from being deformed. In addition, since no impact is transmitted to the counter plate, the counter plate is prevented from falling off. Accordingly, due to the present design and construction, great improvement in an anti-impact property of the spindle motor can be achieved. Furthermore, since the rotary shaft has a small diameter section, the dynamic pressure friction of the rotary shaft with respect to the bearing unit is reduced and this leads to a reduction in power consumption.

In a second embodiment of the present invention to shaft is fixed and the hub is affixed to the bearing sleeve which rotates about the shaft.

An information storage device may be constructed utilizing the novel spindle motor. As is well known in the art, such a storage device would include a information storage medium, conventionally in the form of a disk, a read and/or write head and appropriate control circuitry.

The present invention, including its features and advantages, will become more apparent from the following detailed description with reference to the accompanying drawings.

DETAILED DESCRIPTION

Figure 4:
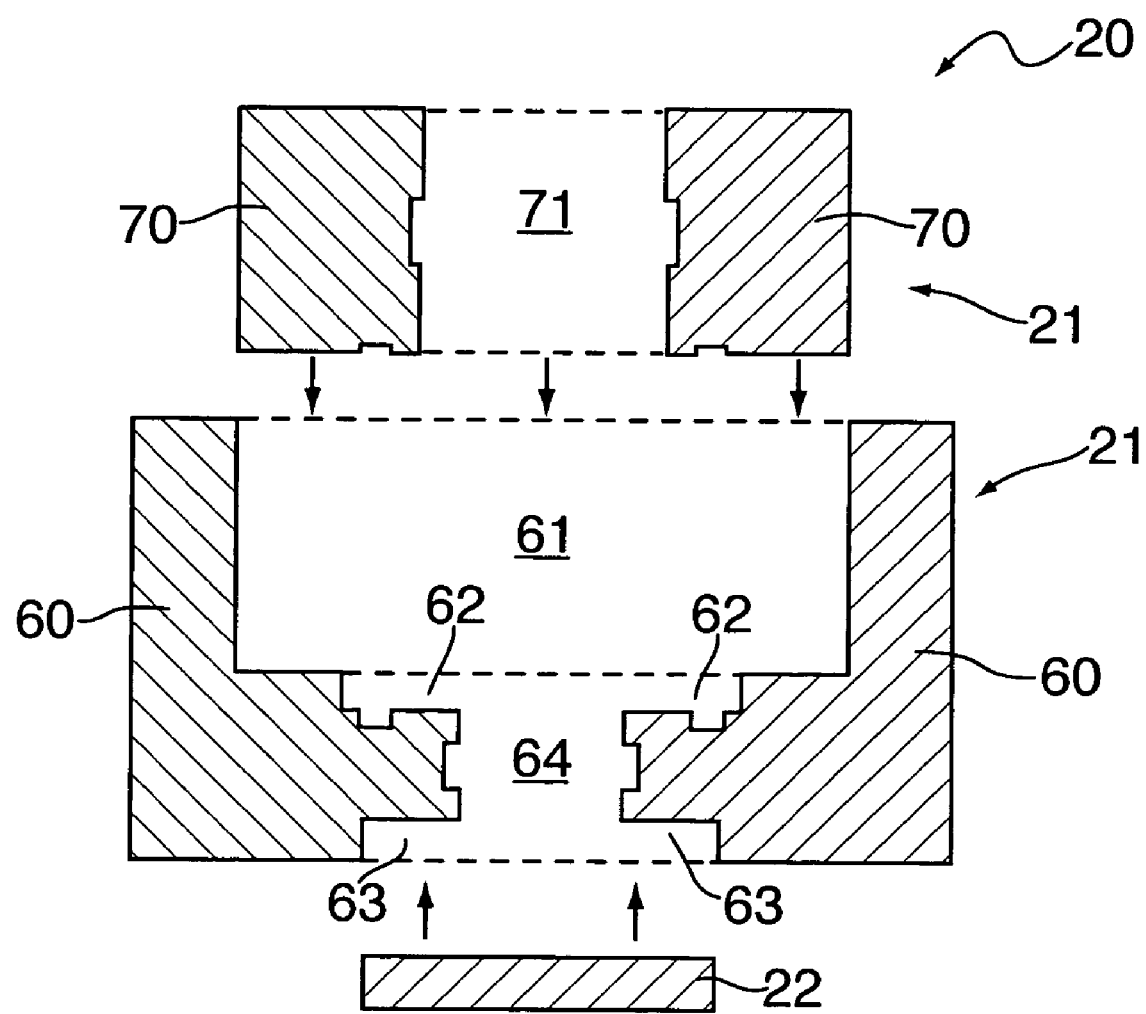
FIG. 4 is an exploded view of the bearing unit of a spindle motor for an HDD, according to an embodiment of the present invention.
Figure 5:
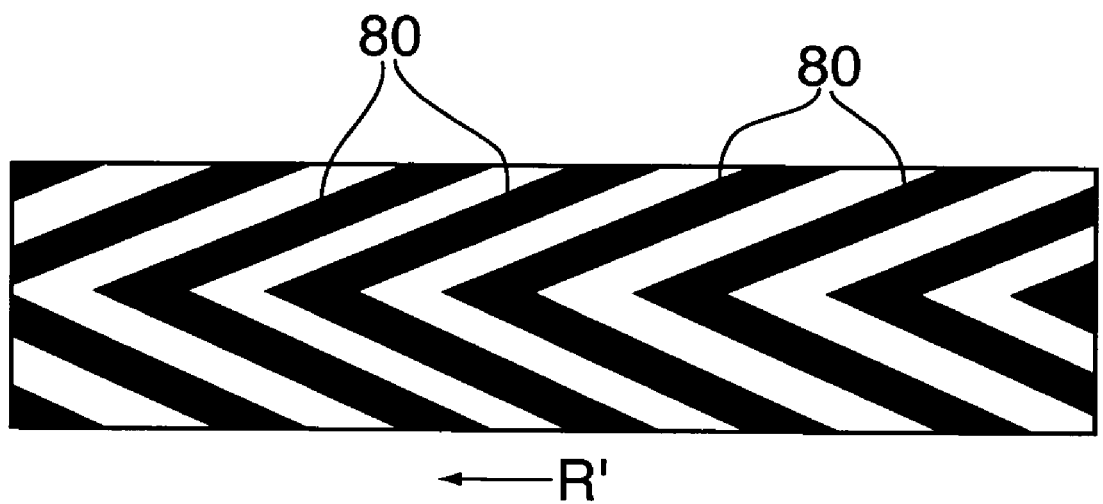
FIG. 5 is an expanded view of the inner peripheral face of the sleeve which shows an example of a dynamic pressure groove, according to an embodiment of the present invention.
Figure 6:
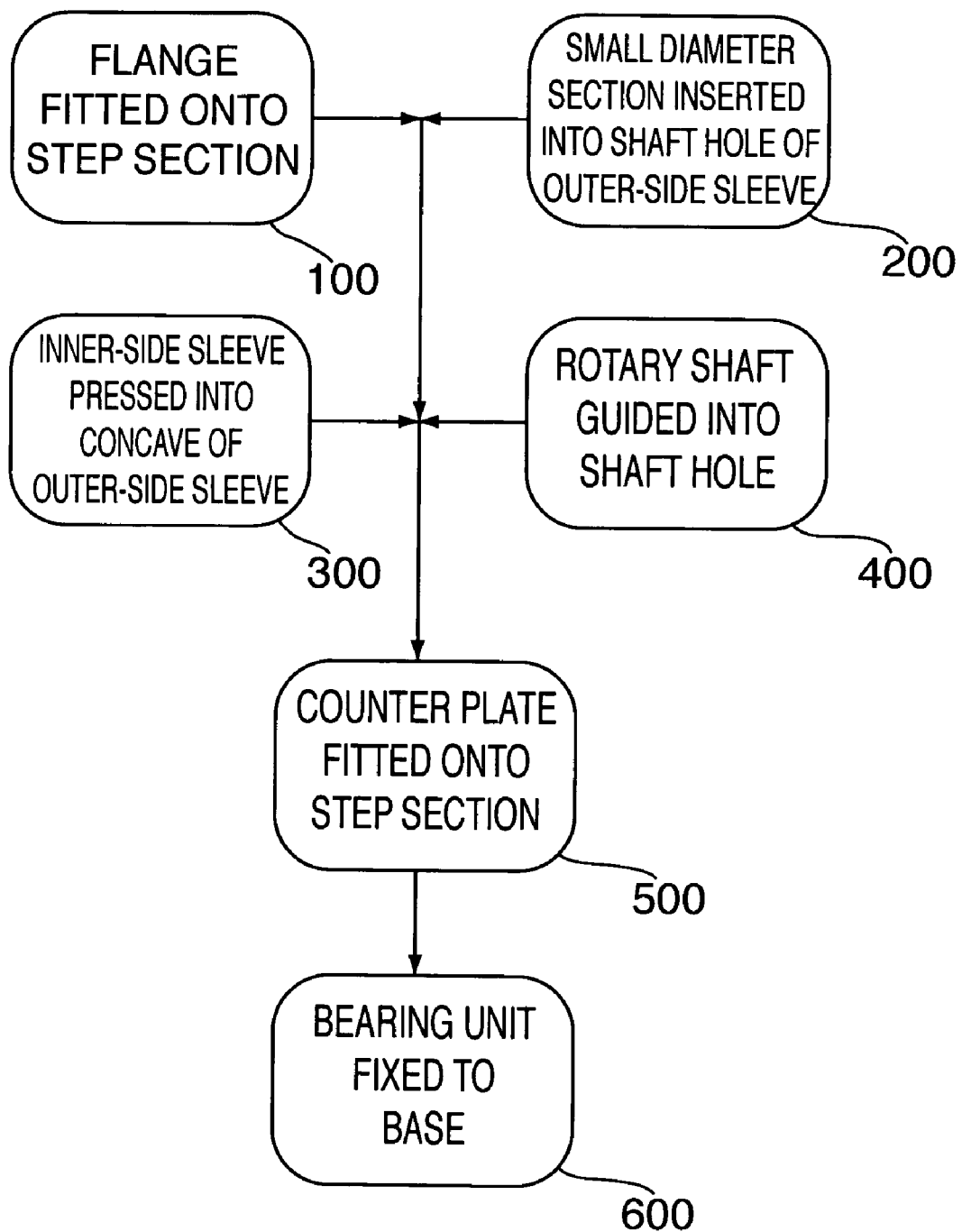
FIG. 6 is a method of construction of a spindle motor for an HDD, according to an embodiment of the present invention.
Figure 7:
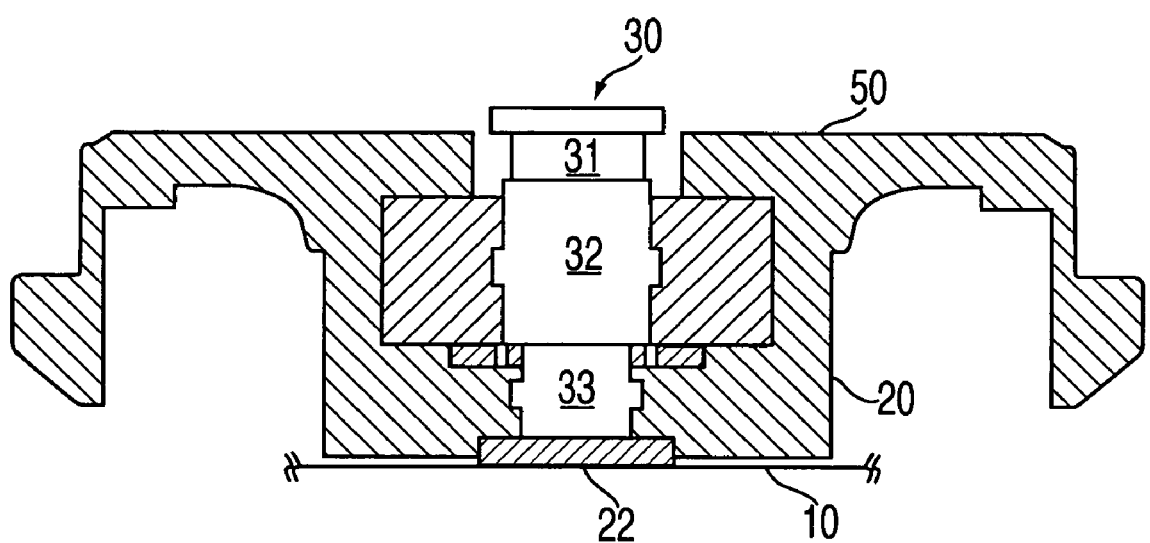
FIG. 7 is a vertical cross sectional view of a spindle motor for an HDD, according to an alternate embodiment of the present invention.

FIGS. 2 through 5 show an apparatus of a spindle motor, while FIG. 6 shows a method of construction of the spindle motor, according to an embodiment of the present invention in which the present invention is applied as a motor for an HDD. FIG. 7 shows an alternative embodiment of the invention with a fixed shaft. Like components are indicated by like reference numerals in each of the figures. It is to be understood, of course, that the spindle motor shown in the drawings and described herein is not to be limited solely to use as a motor for an HDD, and that other uses calling for the characteristics of the spindle motor described herein, such as an accurate and precise rotation, equally apply.

Figure 1:
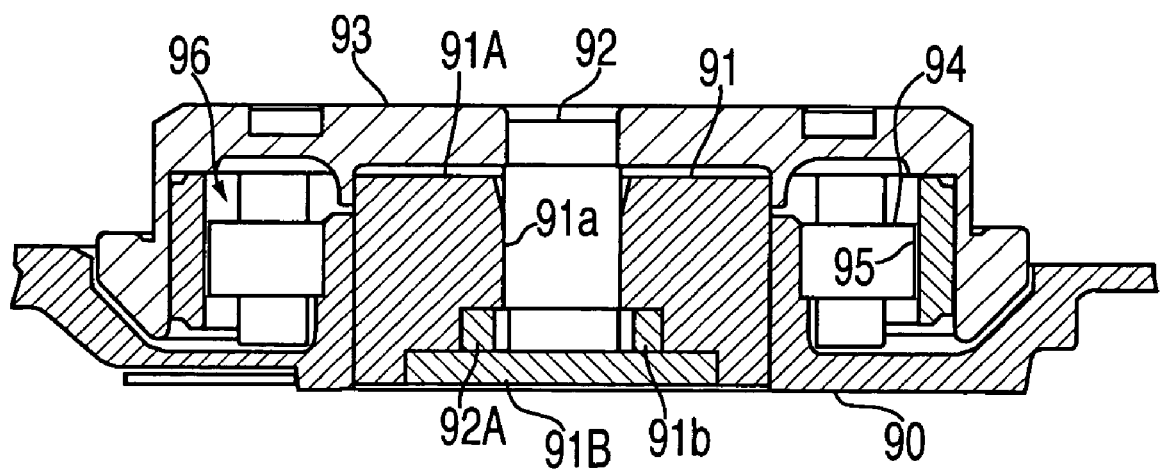
FIG. 1 is a vertical cross sectional view of a conventional spindle motor for an HDD, according to the prior art.
Figure 2:
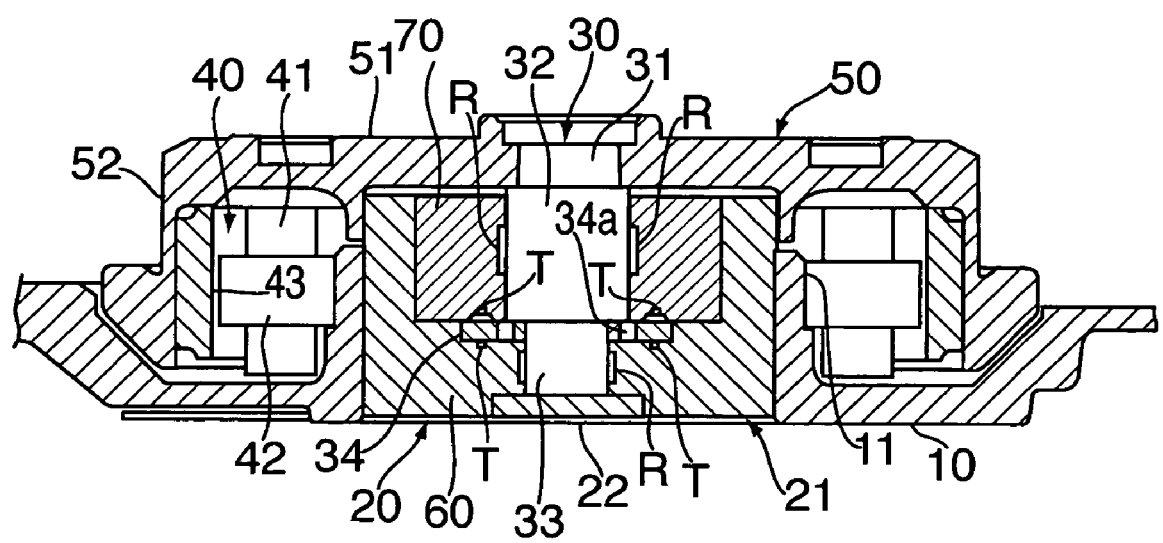
FIG. 2 is a vertical cross sectional view of a spindle motor for an HDD, according to an embodiment of the present invention.

Thus, referring to FIG. 2, a cross-sectional view of the spindle motor according to an embodiment of the present invention is shown. The spindle motor is constructed with a base 10, a bearing unit 20, a rotary shaft 30, a motor 40 and a rotary hub member 50. A cylindrical holder section 11 is formed protruding upwardly at the center of the base 10, and the bearing unit 20 is pressed into this holder section 11. The bearing unit 20 is constructed with a bearing sleeve 21 comprising an outer-side sleeve 60, having a cylindrical shape, an inner-side sleeve 70, and a counter plate 22, having a disk shape which closes a lower-side opening of the bearing sleeve 21. The rotary shaft 30 is supported in a freely rotable manner by the bearing unit 20, whereas the rotary hub member 50 is fixed by means of a bolt (not shown), or the like, to a hub fixing section 31 protruding from an upper-end section the rotary shaft 30. It is to be understood, of course, that the rotary shaft 30 may instead be fixed to the base 10 and the rotary hub member 50 fixed instead to the bearing unit 20. This then, allows for the bearing unit and affixed rotary hub member to rotate around the fixed shaft, as shown in FIG. 7.

The rotary hub member 50 is approximately cylindrical in cross-section, and comprises a disk section 51 and a cylindrical section 52 which descends vertically down from a peripheral edge of the disk section 51. A magnetic disk (not shown) or other information storage medium can be affixed to and fitted within an outer periphery of the rotary hub member 50. In a state in which the rotary hub member 50 is fixed to the rotary shaft 30 inserted into the bearing sleeve 21 of the bearing unit 20, the inner peripheral face of the cylindrical section 52 of the rotary hub member 50 and the outer peripheral face of the holder section 11 of the base 10 oppose each other.

The motor 40 comprises a stator 42 and a motor magnet 43. The stator 42, on which coil 41 is wound, is fixed to the outer peripheral face of the holder section 11 of the base 10, while the motor magnet 43 is fixed to the inner peripheral face of the cylindrical section 52 of the rotary hub member 50. With this motor, a current magnetic field is generated from the stator 42 when a pre-determined current is supplied to the coil 41, and by the electromagnetic interaction generated between this current magnetic field and the motor magnet 43, the rotary hub member 50 is allowed to rotate with the rotary shaft 30 as a center, and thus a magnetic disk is allowed to rotate.

Figure 3:
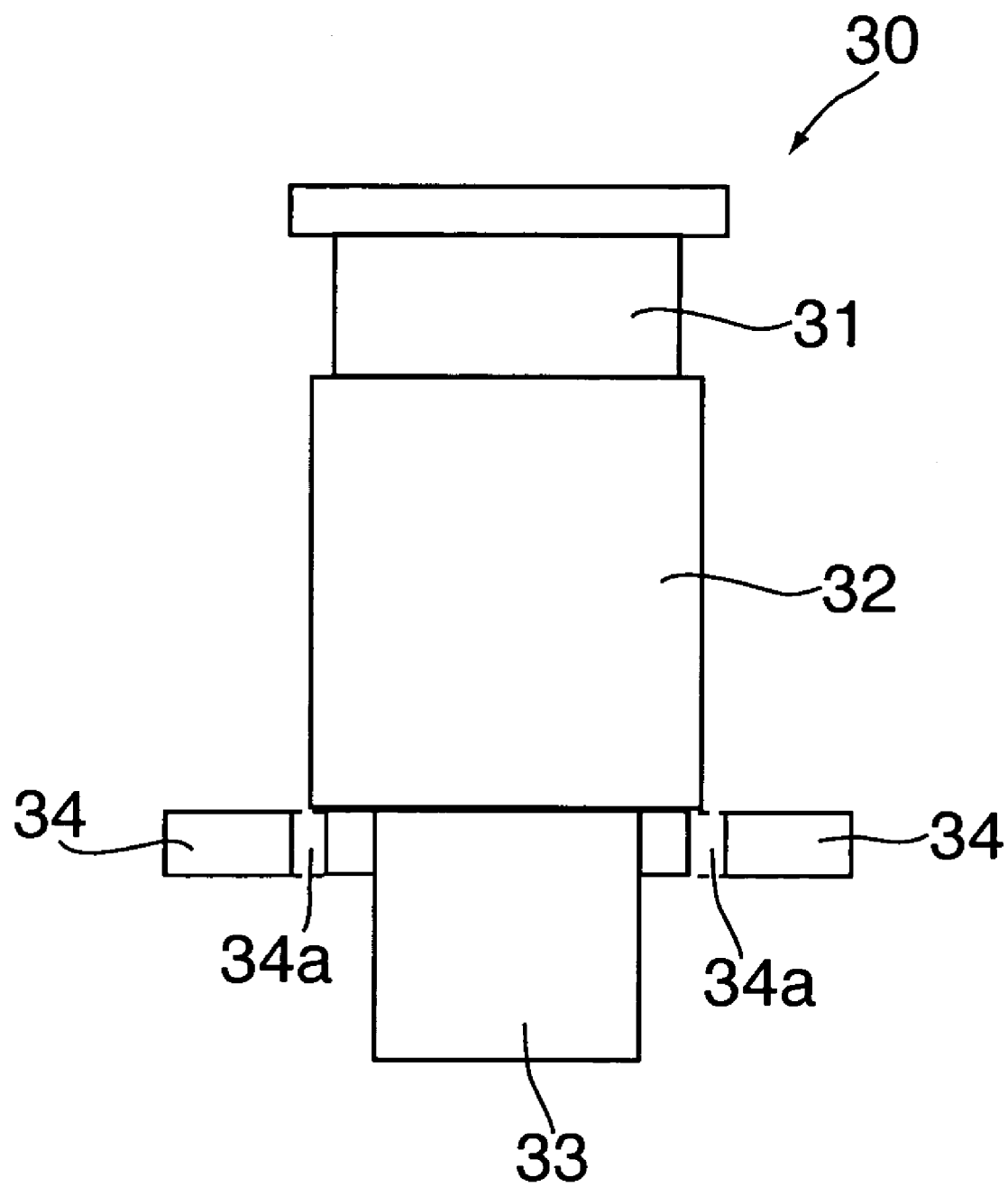
FIG. 3 is an expanded view of the rotary shaft of a spindle motor for an HDD, according to an embodiment of the present invention.

Referring now also to FIG. 3, with respect to the rotary shaft 30, a portion of the shaft below the hub fixing section 31 is inserted into the bearing sleeve 21. The inserted section is divided into a large diameter section 32, having a larger diameter than the hub fixing section 31, and a small diameter section 33, having a diameter smaller than the hub fixing section 31. The large diameter section 32 is preferably longer than the small diameter section 33, and the construction ratio may be approximately 2:1. Furthermore, a flange 34 is provided at the upper-end section of the small diameter section 33. The flange 34, which is a different body from the shaft of the rotary shaft 30, can be attached by such a means as welding, however, it is permissible to form it as a unitary body with the rotary shaft 30. Also, a plurality of oil holes 34a, which pierce through from the top to the bottom, are formed on flange 34 at equal intervals. Oil holes 34a are formed at such locations as to correspond to the outer peripheral face of the large diameter section 32. In this manner then the oil pressure is made uniform on both sides of the flange.

Referring now also to FIG. 4, with respect to the bearing unit 20, it is constructed with the bearing sleeve 21 and the counter plate 22. The bearing sleeve 21 is constructed by pressing an inner-side sleeve 70 having a shaft hole 71 into a concave 61 of a cylindrical shape formed by the outer-side sleeve 60. A round step section 62 and a round step section 63 are formed on a lower face and a bottom face, respectively, of the outer-side sleeve 60, and a shaft hole 64 is formed between these round step sections 62 and 63. The counter plate 22 is fitted into the step section 63 on the lower face. This counter plate 22 is fixed to the outer side sleeve 60 by such a means as pressing-in, welding and adhesion, or the like. It is to be understood, of course, that the shapes of the concave 61 and inner-side sleeve 70 need not be limited to the right angles shown in the drawings, and that instead they may be shaped at any angle to provide a flush and snug fit between the two.

The shaft hole 71 of the inner-side sleeve 70 corresponds to the large diameter section 32 of the rotary shaft 30, whereas the shaft hole 64 of the outer-side sleeve 60 corresponds to the small diameter section 33 of the rotary shaft 30. The flange 34 of the rotary shaft 30 is fitted onto the step section 62. On each of the inner peripheral faces of the respective shaft holes 71 and 64, that is, in the sides facing the large diameter section 32 side and the small diameter section 33 side, are formed grooves for the generation of the radial dynamic pressure. In addition, grooves for the generation of a thrust dynamic pressure are formed respectively in the lower-end face of the inner-side sleeve 70 and in the step section 62 of the outer-side sleeve 60, thereby sandwiching the flange 34 of the rotary shaft 30. The formation of such grooves in this manner creates dynamic pressure generating areas which are indicated by an "R" for a radial dynamic pressure generating area, and a "T" for a thrust dynamic pressure generating area.

Referring now to FIG. 5, as such grooves mention may be made of a plurality of V-shaped herring bone grooves 80. They are formed in such a manner that the tips thereof may converge towards the direction of rotation R' of the rotary shaft 30, and they may be spaced at an equal intervals in the peripheral direction. As such grooves, the herring bone grooves are preferred but it is to be understood that other grooves, such as spiral-shaped grooves, may also be used. Lastly, it is to be understood that the grooves may be formed on either of the rotary shaft or the bearing unit. However, the grooves are in general formed on the fixed side, that is to say, on the bearing unit side.

Referring now again to FIGS. 2, 3 and 4, the actions of the rotary shaft 30 in concert with the bearing unit 20 which supports it can be explained. When the rotary shaft 30 is rotated by the action of the motor 40, a lubricant penetrates between the bearing unit 20 and the rotary shaft 30, thereby forming an oil film between the two. The lubricant is supplied to each of the grooves for generation of a radial dynamic pressure and a thrust dynamic pressure of the bearing sleeve 21. Further, the construction of the flange 34 on the rotary shaft 30, that is, its positioning at the mid-point in the axial direction, also generates a thrust dynamic pressure. That is, when the lubricant becomes pressurized, dynamic pressure is generated at the radial side and at the thrust side. As mentioned above, the areas where the radial dynamic pressure and the thrust dynamic pressure are generated are respectively denoted as a radial dynamic pressure generating area "R" and a thrust dynamic pressure generating area "T". It is to be understood that the dynamic pressure areas are located between the bearing unit 20 and the rotary shaft 30. The radial load of the rotary shaft 30 is received by the radial dynamic pressure generating areas R, and the thrust load of the rotary shaft 30 is received by the thrust dynamic pressure generating areas T. Since the thrust dynamic pressure generating areas T are provided on both end faces of the flange 34, the rotary shaft 30 is restricted in its movement in the upward and downward directions. In addition, the hydraulic pressure at the upper and lower portions of the flange 34 are made uniform by the oil holes 34a of the flange 34.

Furthermore, due to the mid-point positioning of the flange 34, radial dynamic pressure generating areas R are provided on both sides in an axial direction. Therefore, even though the flange 34 is provided for the generation of the thrust dynamic pressure, it becomes possible to provide two rows of the radial dynamic pressure generating areas R with as long as possible a span between the two in the axial direction. These two rows of the radial dynamic pressure generating areas R are provided on both end sections of the section where the rotary shaft 30 is supported by the bearing sleeve 21, and the span between the two can therefore be made maximum in length. Thus, a great improvement in the oscillating characteristics of the rotary shaft 30 can be achieved. In addition, since it is possible to provide two rows of the radial dynamic pressure generating areas R with as long as possible a span without lengthening the rotary shaft 30, it is possible to sufficiently cope with any requirements for the reduction of the thickness of the spindle motor.

In addition, in a case in which an impact force is applied to the rotary shaft 30 in the axial direction towards the counter plate 22 side (i.e., in the downward direction in FIG. 2), the impact is transmitted to and received by the step section 62 of the bearing sleeve 21 from the end face of the counter plate 22 side of the flange 34. Because of this, no stress is applied to the junction section of the flange 34 with respect to the rotary shaft 30, creation of a defect in that junction section may be prevented, and the flange 34 is prevented from being deformed. In addition, since no impact is transmitted to the counter plate 22, the counter plate 22 is prevented from falling off. Due to the above, the impact resistance of the spindle motor is greatly improved. Furthermore, since the small diameter shaft section is formed, the dynamic pressure friction of the rotary shaft with respect to the bearing unit is reduced, and this leads to a reduction in power consumption.

Referring now to FIG. 6, with respect to a method of construction of the spindle motor, construction may begin with the bearing unit 20 and rotary shaft 30. In step 100, the flange 34 is fitted onto the step section 62 of the outer-side sleeve 60 at the same time in step 200 when the small diameter section 33 of the rotary shaft 30 is inserted into the shaft hole 64 of the outer-side sleeve 60. This is followed by step 300 by pressing the inner-side sleeve 70 into the concave 61 of the outer-side sleeve 60, while simultaneously in step 400 guiding the large diameter section 32 of the rotary shaft 30 into the shaft hole 71. Next, in step 500 the counter plate 22 is fitted onto and affixed to the step section 63. In this assembled state, a minute gap into which a lubricant is supplied is formed between the bearing unit 20 and the rotary shaft 30. Further, due to this method of construction, when the rotary shaft 30 is assembled with the bearing sleeve 21 it is possible to position the flange 34 in the axial direction by allowing the flange 34 to be fitted into and contacted with the step section 62 of the outer-side sleeve 60. Finally, in step 600, the bearing unit 20 is fixed to the base 10 by fastening it by a means such as welding, adhesion and securing the resulting assembly in a state in which the outer-side sleeve 60 is pressed or fitted in the holder section 11 of the base 10. This then allows separate assembly of the motor 40 and rotary hub member 50 onto the base 10 at either an earlier or later point in time. Therefore the assembly becomes easy and the manufacturing productivity can be improved.

With respect to the materials by which the bearing unit 20 (and more specifically the outer-side sleeve 60, the inner-side sleeve 70 and the counter plate 22) and the rotary shaft 30 may be constructed, use may be made of, by way of an example, a combination of stainless steel and various types of copper alloys (such as bronze and brass). Alternatively, for the bearing unit 20, use can be made of a porous sintered alloy. In a case in which the bearing unit 20 is made of a copper alloy, it is possible to form the grooves for the generation of the radial dynamic pressure and the thrust dynamic pressure by means of chemical etching, electrolytic etching, and coining. In addition, in a case of a sintered alloy, those grooves can be formed at the time of the molding of pressed powder or at the time of seizing of a sintered body. It is to be understood, of course, that other materials for the bearing unit and rotary shaft, and other methods of construction of the grooves may be utilized.

As explained above with a spindle motor in accordance with the present invention, as the flange of the rotary shaft is provided at the mid-section in the axial direction it is possible to provide two rows of the radial dynamic pressure generating sections with a span as long as possible between the two. As a result of this, radial dynamic pressure generating sections are provided on both sides of this flange, the oscillating characteristics of the rotary shaft are greatly improved, and it is possible to sufficiently cope with any requirements for reduction of the thickness of the spindle motor.

In addition, because the bearing unit structured in accordance with the present invention, the rotary shaft is such that, with the flange as a boundary the open end side of the bearing unit is a large diameter section and the counter plate side is a small diameter section, the step section, which receives the side of the flange towards the counter plate, is formed in the bearing unit and receives any impact to be applied to the rotary shaft. Thus, formation of a defect in the junction section between the large diameter section, the small diameter section and the flange can be prevented, deformation of the flange can be prevented, and the counter plate can be prevented from falling off. As a result of these, a great improvement in an anti-impact property can be achieved.

In addition, with regard to the construction advantages of the spindle motor, it is possible to position the flange in the axial direction by allowing the flange to be fitted into and contacted with the step section. Furthermore, since the shaft is formed with a small diameter section, the dynamic pressure friction of the shaft with respect to the bearing is reduced, and this leads to a reduction in power consumption by the spindle motor.

In the foregoing description, the apparatus and method of the present invention have been described with reference to specific examples. It is to be understood and expected that variations in the principles of the apparatus and method herein disclosed may be made by one skilled in the art and it is intended that such modifications, changes, and substitutions are to be included within the scope of the present invention as set forth in the appended claims. The specification and drawings are accordingly to be regarded in an illustrative rather than in a restrictive sense.

What is claimed is:

1. An apparatus for a spindle motor, comprising:
   a rotary shaft having two ends and a flange near distanced from the two ends in an axial direction;
   a bearing unit, which supports the rotary shaft in a freely rotatable manner, further comprising:
   a bearing sleeve, into which the rotary shaft can be inserted;
   a counter plate, affixed at one end of the bearing sleeve;
   a first step section, in a mid-section of the bearing sleeve, formed to receive the flange;
   a second step section, in a bottom face of the bearing sleeve, formed to receive the counter plate
   an inner-side sleeve having a first shaft hole; and
   an outer-side sleeve having a concave and a second shaft hole;
   wherein the inner-side sleeve fits into the concave of the outer-side sleeve;
   a rotary hub member which is fixed to the rotary shaft; and,
   a motor rotating the rotary hub member by an electromagnetic action,
   wherein a radial dynamic pressure generating area is present between the bearing unit and an outer peripheral surface on the rotary shaft on each side of the flange, and
   wherein at least one thrust dynamic pressure generating area is present between the bearing unit and the flange.

2. The apparatus according to claim 1, wherein at least one of the radial dynamic pressure generating area and the thrust dynamic pressure generating area are formed by grooves made in at least one of the rotary shaft and the bearing unit.

3. The apparatus according to claim 1, wherein the rotary shaft further comprises:
   a large diameter section; and
   a small diameter section,
   wherein the flange is positioned at a juncture between the large diameter section and the small diameter section.

4. The apparatus according to claim 1, wherein at least one oil hole pierces through the flange.

5. The apparatus according to claim 1, wherein a fluid is present between the rotary shaft and the bearing unit.

6. An apparatus for a spindle motor, comprising:
   a rotary shaft having a large diameter section and a small diameter section;
   a flange attached to the rotary shaft between the large diameter section and the small diameter section;
   a bearing unit into which the rotary shaft is inserted;
   a first radial dynamic pressure generating area formed by a first groove between the large diameter section of the rotary shaft and the bearing unit;
   a second radial dynamic pressure generating area formed by a second groove between the small diameter section of the rotary shaft and the bearing unit;
   a first thrust dynamic pressure generating area formed by a third groove between a top surface of the flange and the bearing unit; and
   a second thrust dynamic pressure generating area formed by a fourth groove between a bottom surface of the flange and the bearing unit.

7. The apparatus according to claim 6, further comprising:
   a rotary hub member fixed to the rotary shaft; and
   a motor which causes the rotary hub member to rotate about a vertical axis of the rotary shaft.

8. The apparatus according to claim 6, wherein the bearing unit further comprises:
   a bearing sleeve, which supports the rotary shaft in a freely rotatable manner;
   a counter plate, affixed at one end of the bearing sleeve;
   a first step section, in the bearing sleeve, formed to receive the flange; and a second step section, in a bottom face of the bearing sleeve, formed to receive the counter plate.

9. The apparatus according to claim 6, further comprising:
at least one oil hole piercing through the flange.

10. The apparatus according to claim 6, wherein a fluid is present between the rotary shaft and the bearing unit.

11. An apparatus for a spindle motor, comprising:
a rotary shaft having a large diameter section and a small diameter section;
a flange attached to the rotary shaft between the large diameter section and the small diameter section;
a bearing unit, comprising a bearing sleeve, into which the rotary shaft is inserted;
a first radial dynamic pressure generating area formed by a first groove between the large diameter section of the rotary shaft and the bearing unit; and
a second radial dynamic pressure generating area formed by a second groove between the small diameter section of the rotary shaft and the bearing unit,
wherein the bearing sleeve further comprises:
an inner-side sleeve having a first shaft hole; and
an outer-side sleeve having a concave and a second shaft hole;
wherein the inner-side sleeve fits into the concave of the outer-side sleeve.

12. An apparatus for a spindle motor, comprising:
a rotary shaft having a flange near a mid-point in an axial direction;
a bearing unit supporting the rotary shaft in a freely rotatable manner; and
at least one first row of grooves, on either side of the flange, which create a radial dynamic pressure generating area between the bearing unit and the rotary shaft,
wherein the rotary shaft further comprises:
a large diameter section; and
a small diameter section,
wherein the flange is positioned at a juncture between the large diameter section and the small diameter section; and wherein the bearing unit further comprises a bearing sleeve, the bearing sleeve further comprising:
an inner-side sleeve having a first shaft hole; and
an outer-side sleeve having a concave and a second shaft hole;
wherein the inner-side sleeve fits into the concave of the outer-side sleeve; and
wherein the large diameter section of the rotary shaft fits into the first shaft hole of the inner-side sleeve, and the small diameter section of the rotary shaft fits into the second shaft hole of the outer-side sleeve.

13. The apparatus according to claim 12, further comprising:
at least one second row of grooves, on either side of the flange, which create a thrust dynamic pressure generating area between the bearing unit and the flange.

14. The apparatus according to claim 12, further comprising:
a rotary hub member fixed to the rotary shaft; and
a motor which causes the rotary hub member to rotate about a vertical axis of the rotary shaft.

15. The apparatus according to claim 12, wherein the bearing unit further comprises:
a bearing sleeve, into which the rotary shaft can be inserted;
a counter plate, affixed at one end of the bearing sleeve;
a first step section, in the bearing sleeve, formed to receive the flange; and
a second step section, in a bottom face of the bearing sleeve, formed to receive the counter plate.

16. The apparatus according to claim 12, further comprising:
at least one oil hole piercing from top to bottom through the flange.

17. The apparatus according to claim 12, wherein a fluid is present between the rotary shaft and the bearing unit.

* * * * *

UNITED STATES PATENT AND TRADEMARK OFFICE
CERTIFICATE OF CORRECTION

PATENT NO. : 6,998,745 B2
DATED : February 14, 2006
INVENTOR(S) : Horiuchi et al.

It is certified that error appears in the above-identified patent and that said Letters Patent is hereby corrected as shown below:

<u>Title page,</u>
Item [54], Title, should read as follows:
-- SPINDLE MOTOR AND INFORMATION STORAGE DEVICE HAVING DYNAMIC PRESSURE GENERATING AREAS --.

Signed and Sealed this

Ninth Day of May, 2006

JON W. DUDAS
*Director of the United States Patent and Trademark Office*